United States Patent
Tischler

(10) Patent No.: US 6,624,387 B1
(45) Date of Patent: Sep. 23, 2003

(54) PROCESS FOR MSG-SOLDERING AND USE OF A SHIELDING GAS

(75) Inventor: Friedrich Tischler, Lambach (AT)

(73) Assignee: Linde Aktiengesellschaft, Hoellriegelskreuth (DE)

( * ) Notice: Subject to any disclaimer, the term of this patent is extended or adjusted under 35 U.S.C. 154(b) by 131 days.

(21) Appl. No.: 09/697,595

(22) Filed: Oct. 27, 2000

(30) Foreign Application Priority Data

Oct. 28, 1999 (DE) .......................... 199 52 043

(51) Int. Cl.[7] .............................. B23K 35/38; B23K 1/00
(52) U.S. Cl. ........................................ 219/129; 228/219
(58) Field of Search ................. 219/129; 28/218, 28/219, 220

(56) References Cited

U.S. PATENT DOCUMENTS

| | | | |
|---|---|---|---|
| 3,575,568 A | * | 4/1971 | Tateno |
| 3,601,573 A | * | 8/1971 | Shutey |
| 4,716,272 A | * | 12/1987 | Blad et al. |
| 5,476,210 A | * | 12/1995 | Hodozuka et al. |
| 5,497,936 A | * | 3/1996 | Vojta et al. |
| 5,645,364 A | * | 7/1997 | Hodozuka et al. |
| 5,735,451 A | * | 4/1998 | Mori et al. |
| 5,793,009 A | * | 8/1998 | Offer |
| 5,831,238 A | * | 11/1998 | Takuya et al. |
| 5,908,568 A | * | 6/1999 | Dittmann et al. |
| 6,100,496 A | * | 8/2000 | Takuya et al. |
| 6,158,648 A | * | 12/2000 | Mori et al. |
| 6,198,068 B1 | * | 3/2001 | Lindstrom |

FOREIGN PATENT DOCUMENTS

| | | | |
|---|---|---|---|
| EP | 0549398 A1 | * | 6/1993 |
| JP | 09248668 A | * | 9/1997 |
| SE | WO98/21000 | * | 5/1998 |

OTHER PUBLICATIONS

Translation of JP-409248668A.*
Merkblatt DVS 0938-1 (Sep. 2001).*
DIN EN ISO 4063 (Apr. 2000).*

* cited by examiner

Primary Examiner—Tom Dunn
Assistant Examiner—Kiley Stoner
(74) Attorney, Agent, or Firm—Millen, White, Zelano & Branigan, P.C.

(57) ABSTRACT

The invention relates to MSG-soldering (metal shielding gas-soldering) of metallic materials with use of soldering and an electric arc with consumable electrode or non-consumable electrode, whereby a shielding gas that essentially consists of inert gas is used. According to the invention, the shielding gas contains at least one active gas component in addition to the inert gas. As active gases, oxygen and/or carbon dioxide can be used. The proportion of active gas in the shielding gas is preferably in the range of 0.01 to 0.5% by volume.

24 Claims, No Drawings

PROCESS FOR MSG-SOLDERING AND USE OF A SHIELDING GAS

The invention relates to a process for MSG-soldering of metallic materials with use of soldering materials and an electric arc with consumable electrode or non-consumable electrode, whereby the shielding gas contains one or more inert gas components. MSG-soldering is a type of soldering generally known as brazing in which metals having a high melting temperature are used as bonding materials, rather than the type of soldering in which the melting temperature of metals used as a bonding material is low.

The invention further relates to the use of a shielding gas that contains one or more inert gas components for MSG-soldering of metallic materials with use of soldering materials and an electric arc with consumable electrode or non-consumable electrode.

In the industrial application, welding for connecting metallic materials has been established for a long time. During welding, the materials that are to be connected are melted.

During metal-shielding gas-welding (MSG-welding), an arc burns in a shielding gas shell. As a process variant of the MSG-welding, on the one hand, the metal-inert gas-welding (MIG welding) or the metal-active gas-welding (MAG-welding) is mainly used with consumable electrode, and, on the other hand, the tungsten-inert gas-welding (TIG-welding) is used with non-consumable electrode. The tungsten-plasma-welding (TP-welding) further represents an additional process variant of MSG-welding with non-consumable electrode. The units and devices that are necessary for MSG-welding are well known among experts.

Despite the abundance of welding processes with variants that have been developed in the meantime and that are available, however, possible applications for soldering as an alternative to welding are offered.

Thus, for example, the welding of galvanized, aluminized or otherwise coated materials entails problems. The gases that are produced by a low zinc-evaporation point when galvanized sheets are connected thus disrupt the arc during welding and result in instability of the arc. Pores and welding spatter result from this.

MIG- and TIG-soldering are therefore used as efficient and also economical alternatives to conventional welding techniques. A thermal process for continuous joining of materials is referred to as soldering, whereby a liquid phase is produced by melting solder (soldering material). During soldering, in contrast to welding, the solidus temperature of the materials to be connected is not reached.

The MIG- or TIG-soldering is a hard-soldering process, in which the soldered joint is produced with use of MIG- or TIG-shielding gas welding devices. During MIG- or TIG-soldering, the basic material is not melted, but rather a hard-soldering connection of the materials is produced. The soldering materials that are used have comparatively low melting points on the order of up to about 1000° C. (e.g., 600 to 700° C.)

During MIG- or TIG-soldering, argon, helium or a mixture of argon and helium is usually used as a shielding gas.

Problems also occur once in a while during MSG-soldering under inert shielding gases (MIG- or TIG-soldering), however. For example, there are always arc instabilities, which entail considerable quality loss.

The object of this invention is therefore to indicate a process for MSG-soldering and a use of a shielding gas of the above-mentioned type, which allow an improvement of the MSG-soldering. In particular, a more stable arc, a higher processing speed and a high quality of the soldered joint are to be achieved with the invention during MSG-soldering.

This object is achieved according to the invention in that the shielding gas contains at least one active gas component.

It has namely been shown, surprisingly enough, that by mixing in at least one active gas component in one or more inert gas components of the shielding gas, the MSG-soldering can be improved in the desired way.

The invention comprises process variants of the MSG-soldering with consumable electrode (MIG- or MAG-soldering) and with non-consumable electrode (TIG- and TP-soldering).

Since the shielding gas has at least one active gas component in addition to inert gas or inert gases, in the process according to the invention for MSG-soldering with consumable electrode relative to the known MIG-soldering under (only) inert shielding gases, what is involved here is MAG-soldering or else MIG-MAG-soldering. For TIG-soldering and TP-soldering, there are no corresponding commonly known abbreviations from welding technology that deal with the use of active gases.

As active gas components, preferably oxygen and/or carbon dioxide are used. This is surprising to the extent that, as the task of the shielding gas during soldering, the object is to ensure adequate prevention of the formation of oxides during the soldering process (cf., for example, DIN 8505). It has been shown, however, that by the addition of active gas according to the invention to the inert shielding gas, a higher processing speed and more stable arc with high quality of the soldering joint during MSG-soldering can be achieved.

The addition of active gas must not be too large, however, so that the gas mixture can meet the object as a shielding gas. In the process variants with non-consumable electrode (TIG-soldering and TP-soldering), the proportion of active gas in the shielding gas is also limited, since it can result in damages of the electrodes in the case of excessive active gas portions in the shielding gas. For the MSG-soldering, in particular shielding gas mixtures with a proportion of active gas of about 0.01 to 0.5% by volume, preferably 0.01 to 0.2% by volume, especially preferably 0.02 to 0.1% by volume, have proven to be of value. Within the scope of the invention, in a shielding gas with oxygen and carbon dioxide, the proportion of oxygen in the shielding gas mixture can be selected equal to, larger or smaller than the proportion of carbon dioxide.

Argon and/or helium are suitable as inert gases for the shielding gas. It was possible to achieve good results especially with a shielding gas mixture, which as inert gas contains argon and 0 to 50% by volume of helium, preferably about 10 to 40% by volume of helium.

As solder, basically all suitable materials can be used in connection with the invention. This applies especially for alloys or pure metals that are suitable as additional material for soldering. The additional material used as solder advantageously contains copper (Cu). As soldering materials, however, aluminum-bronze alloys (Al Bz), for example, Al Bz 10 Fe, Al Bz 8 and the like) are preferably used.

In the process according to the invention for MSG-soldering, unalloyed, low-alloy or high-alloy steel, especially chromium-nickel steel (CrNi steel), copper (Cu) and Cu-containing materials, especially Cu-containing non-iron metals, can be used as metallic materials. The metallic materials that are to be processed using MSG-soldering can be coated in this case (e.g., coatings that contain zinc or aluminum) or else uncoated.

The MSG-soldering according to the invention is distinguished in that at comparatively low cost, a soldered joint can be produced with low heat incorporation and with reduced delay.

In a configuration of the invention, mainly short arcs and pulsed arcs are used as arc types in MSG-soldering with consumable electrode, whereby spray arcs known from welding technology can also be used, however.

With the MSG-soldering according to the invention, a process with reproducible high quality is available. The MSG-soldering is suitable for various weld geometries, for example fillet welds or overlapping welds, but can also be used for corner welds. In addition, greater tolerances can be allowed, since small air gaps can be very easily filled up during MSG-soldering.

Priority application DE 19952043.7 filed in Germany on Oct. 28, 1999 is incorporated herein by reference in its entirety.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for MSG-brazing of metallic materials with use of brazing materials and an electric arc, comprising using a consumable electrode in a shielding gas containing at least one inert gas component and containing at least one active gas component in a range of 0.01 to 0.5% by volume of the shielding gas.

2. A process according to claim 1, wherein the at least one active gas component consists of an active gas selected from the group consisting of oxygen, carbon dioxide and a component mixture of oxygen and carbon dioxide.

3. A process according to claim 2, wherein the shielding gas has a proportion of active gas in a range of 0.01 to 0.5% by volume.

4. A process according to claim 3, wherein the shielding gas contains argon and 0 to 50% by volume helium.

5. A process according to claim 4, wherein the metallic brazing material is selected from the group consisting of copper (Cu) and aluminum-bronzes (Al Bz).

6. A process according to claim 5, wherein the metallic materials are selected from the group consisting of unalloyed, low-alloy and high-alloy steel, CrNi steel, copper and Cu-containing materials.

7. A process according to claim 2, wherein the shielding gas has a proportion of active gas in the range of 0.01 to 0.2% by volume.

8. A process according to claim 7, wherein the shielding gas contains argon and 0 to 50% by volume helium.

9. A process according to claim 8, wherein the soldering material contains copper (Cu) and aluminum-bronzes (Al Bz).

10. A process according to claim 9, wherein the metallic materials are selected from the group consisting of unalloyed, low-alloy and high-alloy steel, CrNi steel, copper and Cu-containing materials.

11. A process according to claim 2, wherein the shielding gas has a proportion of active gas in a range of 0.02 to 0.1% by volume.

12. A process according to claim 11, wherein the shielding gas contains argon and 0 to 50% by volume helium.

13. A process according to claim 12, wherein the brazing material contains copper (Cu) and aluminum-bronzes (Al Bz).

14. A process according to claim 13, wherein the metallic materials are selected from the group consisting of unalloyed, low-alloy and high-alloy steel, CrNi steel, copper and Cu-containing materials.

15. A process according to claim 2, wherein the shielding gas has a proportion of active gas in a range of 0.01 to 0.2% by volume.

16. A process according to claim 2, wherein the shielding gas has a proportion of active gas in a range of 0.02 to 0.2% by volume.

17. A process according to claim 1 wherein the shielding gas has a proportion of active gas in a range of 0.01 to 0.5% by volume.

18. A process according to claim 1 wherein the shielding gas contains argon and helium, the helium percentage being in the range of 10 to 40% by volume.

19. A process according to claim 1, wherein short arcs, pulsed arcs or spray arcs are used as arc types for MSG-brazing with a consumable electrode.

20. A process comprising use of a shielding gas that contains one or more inert gas components for MSG-brazing of metallic materials with use of brazing materials and an electric arc with a consumable electrode, wherein the shielding gas contains at least one active gas component in a range of 0.01 to 0.5% by volume of the shielding gas.

21. A process comprising use of a shielding gas according to claim 20, wherein the shielding gas contains oxygen, carbon dioxide or a mixture of oxygen and carbon dioxide as the active gas.

22. A process comprising use of a shielding gas according to claim 20, wherein the shielding gas has a proportion of active gas in a range of 0.01 to 0.5% by volume.

23. A process comprising use of a shielding gas according to claim 22, wherein the shielding gas contains argon and 0 to 50% by volume of helium.

24. A process comprising use of a shielding gas according to. claim 19 wherein the shielding gas contains argon and 0 to 50% by volume of helium.

* * * * *